(12) United States Patent
Vyas et al.

(10) Patent No.: US 10,775,880 B2
(45) Date of Patent: Sep. 15, 2020

(54) ANIMATED CHARACTER HEAD SYSTEMS AND METHODS

(71) Applicant: Universal City Studios LLC, Universal City, CA (US)

(72) Inventors: Anisha Vyas, Orlando, FL (US); Caitlin Amanda Correll, Orlando, FL (US); Sean David McCracken, Winter Garden, FL (US); William V. McGehee, Maitland, FL (US)

(73) Assignee: Universal City Studios LLC, Universal City, CA (US)

( * ) Notice: Subject to any disclaimer, the term of this patent is extended or adjusted under 35 U.S.C. 154(b) by 353 days.

(21) Appl. No.: 15/486,814

(22) Filed: Apr. 13, 2017

(65) Prior Publication Data

US 2018/0147728 A1    May 31, 2018

Related U.S. Application Data

(60) Provisional application No. 62/428,200, filed on Nov. 30, 2016.

(51) Int. Cl.
*G05B 15/00* (2006.01)
*G06F 3/01* (2006.01)
(Continued)

(52) U.S. Cl.
CPC .............. *G06F 3/012* (2013.01); *A63J 7/005* (2013.01); *B25J 11/0005* (2013.01);
(Continued)

(58) Field of Classification Search
CPC ... B25J 11/0005; B25J 11/0015; B25J 11/001; A63J 7/005; G06F 3/013; G06F 3/011;
(Continued)

(56) References Cited

U.S. PATENT DOCUMENTS

| | | | |
|---|---|---|---|
| 4,660,033 A | 4/1987 | Brandt | |
| 6,016,385 A * | 1/2000 | Yee | B25J 3/04 700/245 |

(Continued)

FOREIGN PATENT DOCUMENTS

| | | |
|---|---|---|
| CN | 2598084 | 1/2004 |
| CN | 202929567 U | 5/2013 |

(Continued)

OTHER PUBLICATIONS

U.S. Appl. No. 15/939,887, filed Mar. 29, 2018, Anisha Vyas.
(Continued)

*Primary Examiner* — Khoi H Tran
*Assistant Examiner* — B M M Hannan
(74) *Attorney, Agent, or Firm* — Fletcher Yoder, P.C.

(57) ABSTRACT

A system includes an animated character head having one or more processors configured to receive an input, to make an animation selection based on the input, and to provide a first control based on the animation selection. The animated character head also includes a display configured to provide an indication of the animation selection for visualization by a performer operating the animated character head.

19 Claims, 3 Drawing Sheets

(51) Int. Cl.
 *A63J 7/00* (2006.01)
 *B25J 11/00* (2006.01)
 *G06K 9/00* (2006.01)

(52) U.S. Cl.
 CPC .......... *B25J 11/0015* (2013.01); *G06F 3/013* (2013.01); *G06F 3/014* (2013.01); *G06K 9/00302* (2013.01)

(58) Field of Classification Search
 CPC .......... G06K 9/00302; G06K 9/00335; G06K 9/00342; G06K 9/00348; G06K 9/00355; G06K 9/00362
 USPC ................................. 700/257–259
 See application file for complete search history.

(56) References Cited

U.S. PATENT DOCUMENTS

| | | | | |
|---|---|---|---|---|
| 6,500,041 | B1* | 12/2002 | Crome, Jr. | A42B 1/004 2/195.1 |
| 7,997,991 | B2 | 8/2011 | Kanemaru et al. | |
| 8,371,893 | B2 | 2/2013 | Eck et al. | |
| 8,517,788 | B2 | 8/2013 | Eck et al. | |
| 8,801,488 | B2 | 8/2014 | Irmler | |
| 2002/0081937 | A1* | 6/2002 | Yamada | A63H 3/48 446/175 |
| 2005/0091684 | A1* | 4/2005 | Kawabata | B25J 9/0003 725/35 |
| 2007/0192910 | A1* | 8/2007 | Vu | B25J 5/007 700/245 |
| 2010/0144239 | A1* | 6/2010 | Eck | A63J 7/005 446/330 |
| 2011/0092131 | A1* | 4/2011 | Heilbron | A63H 3/006 446/268 |
| 2012/0068913 | A1* | 3/2012 | Bar-Zeev | G02B 26/026 345/8 |
| 2013/0073087 | A1* | 3/2013 | Irmler | B25J 11/0015 700/259 |
| 2013/0130585 | A1 | 5/2013 | Eck | |
| 2013/0226588 | A1 | 8/2013 | Irmler | |
| 2014/0184496 | A1* | 7/2014 | Gribetz | G02B 27/017 345/156 |
| 2014/0358263 | A1* | 12/2014 | Irmler | G06F 3/014 700/94 |
| 2016/0041581 | A1* | 2/2016 | Piccionelli | G06F 1/163 345/156 |
| 2016/0131908 | A1* | 5/2016 | Fateh | G02B 27/646 345/633 |
| 2016/0203359 | A1* | 7/2016 | von und zu Liechtenstein | G06F 3/013 345/156 |
| 2016/0343164 | A1* | 11/2016 | Urbach | G02B 27/0093 |
| 2017/0018289 | A1* | 1/2017 | Morgenstern | G11B 27/036 |
| 2017/0148434 | A1* | 5/2017 | Monceaux | G10L 15/1815 |
| 2017/0285757 | A1* | 10/2017 | Robertson | G06F 3/017 |
| 2017/0352183 | A1* | 12/2017 | Katz | G06K 9/00255 |
| 2018/0036887 | A1* | 2/2018 | Shim | B25J 11/0015 |
| 2019/0105783 | A1* | 4/2019 | Al Moubayed | B25J 11/003 |

FOREIGN PATENT DOCUMENTS

| | | |
|---|---|---|
| CN | 104941220 A | 9/2015 |
| CN | 105022479 A | 11/2015 |

OTHER PUBLICATIONS

Slyper, Ronit, et al., "A Tongue Input Device for Creating Conversations," UIST'11, Oct. 16-19, 2011, ACM, 9 pgs.
PCT/US2017/063513 Invitation to Pay Additional Fees dated Jun. 22, 2018.
CN 2017800741655 Office Action dated May 12, 2020.

* cited by examiner

ANIMATED CHARACTER HEAD SYSTEMS AND METHODS

CROSS-REFERENCE TO RELATED APPLICATION

This application claims priority from and the benefit of U.S. Provisional Application No. 62/428,200, entitled "Animated Character Head Systems and Methods," filed Nov. 30, 2016, which is hereby incorporated by reference in its entirety for all purposes.

BACKGROUND

The present disclosure relates generally to the field of amusement parks. More specifically, embodiments of the present disclosure relate to systems and methods utilized to provide amusement park experiences.

Amusement parks and other entertainment venues contain, among many other attractions, animated characters that interact with park guests. For example, the animated characters may walk around the amusement park, provide entertainment, and speak or wave at the amusement park guests, among other suitable actions. Certain animated characters may include a performer in a costume with an animated head that covers the performer's face. However, it may be difficult for the performer to operate the animated head to provide a realistic interaction with guests attending amusement parks.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes an animated character head having one or more processors configured to receive an input, to make an animation selection based on the input, and to provide a first control based on the animation selection. The animated character head also includes a display configured to provide an indication of the animation selection for visualization by a performer operating the animated character head.

In accordance with one embodiment, a system includes an animated character head having one or more processors configured to receive an input, to make an animation selection based on the input, and to provide a control signal based on the animation selection. The input includes a first signal indicative of eye movement of a performer operating the animated character head, a second signal indicative of facial gestures of the performer operating the animated character head, or a combination thereof.

In accordance with one embodiment, a method includes the steps of providing, using one or more processors, one or more available animation selections on a display within an animated character head; receiving a selection, via the one or more processors, of a first animation of the one or more available animation selections based on an eye movement of a performer operating the animated character head, a facial gesture of the performer operating the animated character head, a vocal command of the performer operating the animated character head, or a combination thereof; and providing, using the one or more processors, a control signal to execute the first animation on the animated character head.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
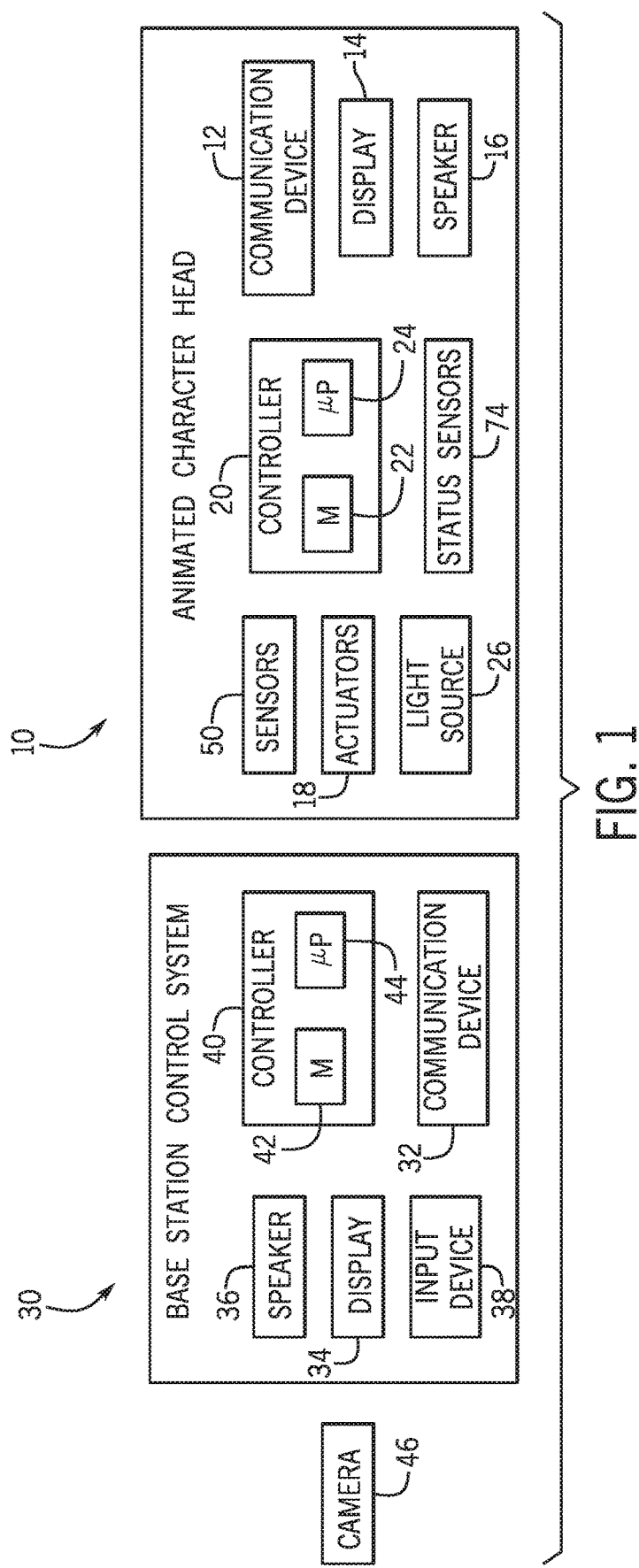
FIG. 1 is a block diagram of an Animated Character Head and a base station control system, in accordance with an embodiment.

The present disclosure relates to amusement parks. More specifically, the present disclosure relates to systems and methods related to controlling the heads and/or faces of animated characters, which each may be hereinafter referred to as an "Animated Character Head."

Provided herein are Animated Character Head systems that incorporate one or more features to provide more realistic gestures, which may enhance the experience of a guest attending an amusement park. From blinking eyes to gestures (e.g., facial gestures, such as smiling gestures), as well as mouth movement synchronized with speech (e.g., pre-recorded speech), the Animated Character Head disclosed herein enables a character to interact with and/or react to guests. The Animated Character Head may be worn by a performer and may be capable of displaying a variety of realistic expressions composed of various combinations of movements and/or features, such as eye blinks, eye brow positioning, jaw motions, and lip shapes, for example. These movements and/or features may be combined to form a large library of animations (e.g., database or selection menu) stored in and accessible from a controller that can be used by the performer to interact with guests, providing a unique interactive experience.

In certain embodiments, multiple movements and/or features selected from the library of animations may create a complete motion profile (e.g., a complete motion and/or display profile, such as the Animated Character Head fully actuating and appearing as if it is speaking a sentence). In further embodiments, the complete motion profiles may be stored in the library of animations. Selection of these movements, features, and/or motion profiles (e.g., animation selection) may be done via eye tracking, machine vision, vocal commands, a base station control system (e.g., remote control system), a traditional input device (e.g., switch, button, motion sensors, foot controls, or wearable input device, such as a myo input, ring input, or gesture gloves) by the performer, or any combination thereof.

In some embodiments, one type of input (e.g., eye tracking) may be utilized to make one type of selection (e.g., eye blinks or one type of speech selection, such as a greeting) and another type of input (e.g., a traditional input device)

may be utilized to make another type of selection (e.g., lip shapes or another type of speech selection, such as other phrases). Based on the selection of movements, features, and/or motion profiles, the Animated Character Head will "animate" by syncing mechanical actuation (e.g., eye blinks, jaw movement, lip shapes, or the like) with audio and/or lighting internal to the Animated Character Head.

As discussed in more detail below, certain embodiments may enable the Animated Character Head to be controlled by the performer wearing the Animated Character Head without use of a base station controller. Furthermore, certain embodiments may enable the performer to be aware of the system status (e.g., current animation selection, upcoming animation selection, component failure, and/or currently playing animation) of the Animated Character Head, such as via display of the system status within the Animated Character Head (e.g., on a display device, such as an augmented reality interface). Certain embodiments may include a modular design that makes the Animated Character Head a standalone unit (e.g., having an onboard controller with a processor and a memory device).

In certain embodiments, the Animated Character Head may be configured to store data related to animations in a library of animations that includes movements, features, and/or motion profiles stored in an onboard memory device and/or play back animation (e.g., the selected animation) on the physical structure (e.g., face) of the Animated Character Head (e.g., via a controller that provides control signals to various actuators, speakers, light sources, or the like). The performer may then select multiple animations to be executed on the face of the Animated Character Head. The list of animations may be stored in a library of animations in a controller to cause the Animated Character head to execute the animations in a sequence or collectively at the same time (e.g., first blink, then flash a light, then say, "hello," and finally smile).

In further embodiments, a selected animation (e.g., as selected by the performer or at a base station controller) may be displayed within the Animated Character Head to enable the performer to view and/or to confirm an upcoming animation selection displayed as feedback information (e.g., via a confirmation input to instruct the controller to carry out the animation selection). In certain embodiments, external cameras (e.g., physically separate from the Animated Character Head) may be provided to obtain images (e.g., still or moving images, such as video) of the currently playing animation (e.g., current movements or features of the Animated Character Head), which may be relayed to the Animated Character Head (e.g., via wireless communication devices, such as transceivers) for display via the display device to provide feedback and to enable the performer to visualize the currently playing animation. In some embodiments, the selected animation (e.g., a text, image, graphic indicative of the animation selected by the performer or at a base station controller) may be displayed within the Animated Character Head to enable the performer to view and/or to confirm an upcoming animation selection (e.g., via a confirmation input to instruct the controller to carry out the animation selection). In certain embodiments, one or more components of the Animated Character Head (e.g., the input device, display device, actuator, sensor, controller, and/or other components) and/or the performer's actions to make the animation selection may be visually undetectable to guests.

With the foregoing in mind, FIG. 1 is a block diagram of an embodiment of a system having an Animated Character Head 10, which may be worn by a performer. In certain embodiments, the system may include a base station control system 30 (e.g., remote control system). It should be understood that the illustrated system is merely intended to be exemplary, and that certain features and components may be omitted and various other features and components may be added to facilitate performance, in accordance with the disclosed embodiments.

As shown, the Animated Character Head 10 includes a controller 20 (e.g., electronic controller) with a memory 22 and a processor 24. In certain embodiments, the memory 22 is configured to store instructions, data, and/or information, such as a library of animations (e.g., database or selection menu of available animations). As discussed in more detail below, in certain embodiments, the processor 24 is configured to receive inputs (e.g., signals from one or more sensors 50), to select an animation from the library of animations (e.g., a selected animation) based on the received inputs, and/or to provide control signals to a display 14, a speaker 16, an actuator 18, and/or a light source 26 based on the received inputs and/or in accordance with the selected animation. In this way, the Animated Character Head 10 may enable the performer to control the gestures and actions of the Animated Character Head 10.

To facilitate control of the Animated Character Head 10, the Animated Character Head 10 may include one or more sensors 50 that are configured to monitor the performer and/or to receive inputs from the performer. For example, as discussed in detail below, the sensors 50 may include eye tracking sensors that may be configured to monitor eye movement of the performer, machine vision sensors that may be configured to monitor movement of the performer's face, audio sensors that may be configured to receive spoken inputs or other audible inputs from the performer, physical input sensors that may be configured to receive a physical or manual input from the performer, or the like, and/or any combination thereof. The inputs may be processed by the processor 24 to select an animation from the library of animations stored in the memory 22.

The actuators 18 may be any suitable actuators, such as electromechanical actuators (e.g., linear actuator, rotary actuator, etc.). The actuators 18 may be located inside the Animated Character Head 10 and be configured to adjust certain features or portions of the Animated Character Head 10 (e.g., the eyes, eyebrows, cheeks, mouth, lips, ears, light features, or the like). For example, a rotary actuator may be positioned inside the Animated Character Head 10 along the outer cusps of the lips of the Animated Character Head 10 to cause the face of the Animated Character Head 10 to smile in response to a control signal (e.g., from the processor 24). As a further example, the Animated Character Head 10 may contain an electric linear actuator that drives the position of the eyebrows (e.g., to frown) of the Animated Character Head 10 in response to a control signal (e.g., from the processor 24). As shown, the Animated Character Head 10 may include the light source 26, and the duration, brightness, color, and/or polarity of the light emitted from the light source 26 may be controlled based on a control signal (e.g., from the processor 24). In some embodiments, the light source 26 may be configured to project light onto a screen or other surface of the Animated Character Head 10, such as to display a still image, a moving image (e.g., a video), or other visible representation of facial features or gestures on the Animated Character Head 10. In some embodiments, the actuators 18 and/or the light source 26 may enable the Animated Character Head 10 to provide any of a variety of projected facial features or gestures, animatronic facial features or gestures, or combinations thereof.

In some embodiments, the system may be configured to display an indication of available animations (e.g., a list of animations stored in the library in the memory 22), as well as an indication of the selected movements, features, and/or animation on the display 14 (e.g., a display of text, images, graphics, or the like) for visualization by the performer wearing the Animated Character Head 10. By displaying the animation selection inside the Animated Character Head 10, the performer may have a visual indication, a feedback signal, and/or a confirmation of the selections, thereby improving the show quality by allowing the performer to be more prepared, for example. For example, in operation, the display 14 may provide a list of available animations and the one or more sensors 50 may obtain an input from the performer (e.g., an eye tracking sensor may enable the performer to provide the input with certain eye movements) to enable the performer to scroll through the list of available animations and/or to select an animation from the list of available animations. In some embodiments, a preset list of multiple animations to be performed over time or a series of multiple animations selected by the performer to be performed over time may be provided on the display 14. In some embodiments, the multiple animations provided on the display 14 may be changed, modified, switched, delayed, or deleted by the performer via various inputs to the one or more sensors 50, thereby enabling efficient updates by the performer during interactions with guests. In some embodiments, the processor 24 may be configured to instruct the display 14 to provide a list of previously performed animations to facilitate visualization and to facilitate selection of future animations by the performer.

The display 14 may be utilized to provide various other information. For example, in some embodiments, an external camera 46 (e.g., physically separate from the Animated Character Head 10) may be provided to obtain images (e.g., still or moving images, such as video) of the currently playing animation (e.g., current movements or features of the Animated Character Head 10), which may be relayed to the Animated Character Head 10 (e.g., via wireless communication devices, such as transceivers) for display via the display 14 to provide feedback and to enable the performer to visualize the currently playing animation and/or the surrounding environment.

In certain embodiments, the Animated Character Head 10 may include one or more status sensors 74 configured to monitor a component status and/or a system status (e.g., to determine whether a performed animation does not correspond to the selected animation), and an indication of the status may be provided via the display 14. For example, a status sensor 74 may be associated with each actuator 18 and configured to detect a position and/or movement of the actuator 18, which may be indicative of the whether the actuator 18 is functioning properly (e.g., moving in an expected way based on the selected animation). In certain embodiments, the system may be configured to provide an indication of component failure, a current animation selection, an upcoming animation selection, a currently playing animation, or the like to the performer via the display 14.

The processor 24 may execute instructions stored in the memory 22 to perform operations, such as determining the complete motion profile (e.g., animations) to execute on the face of the Animated Character Head 10. As such, in some embodiments, the controller 20 may include one or more general purpose microprocessors, one or more application specific processors (ASICs), one or more field programmable logic arrays (FPGAs), or any combination thereof. Additionally, the memory 22 may be a tangible, non-transitory, computer-readable medium that store instructions executable by and data to be processed by the processor 24. Thus, in some embodiments, the memory 22 may include random access memory (RAM), read only memory (ROM), rewritable non-volatile memory, flash memory, hard drives, optical discs, and the like.

In certain embodiments, a handler may utilize the input device 38 (e.g., a tangible input system, such as a computing device, a computer, a tablet, smart phone, or the like) to provide an input and/or to select animations. The handler is a person other than the performer wearing the Animated Character Head 10, and the handler may walk around with and/or be close-by to the performer as the performer wears the Animated Character Head 10. In such cases, the handler's selections may be transmitted wirelessly or through a wired connection to the Animated Character Head 10 via the communication device 32. In some embodiments, the performer may be notified of the handler's selection (e.g., via the display device 14). In some embodiments, the Animated Character Head 10 may enable the performer to veto, delay, and/or modify the selection (e.g., via inputs to the one or more sensors 50). In some embodiments, the performer may accept or approve the handler's animation selection (e.g., press "go", indicate approval via inputs to the one or more sensors 50) to play the animation. In some embodiments, the selections may be provided, accepted, vetoed, delayed, and/or modified by the eye tracking sensor, the vocal command sensor, the machine vision sensor, and/or physical input sensor (e.g., to a traditional input device) or any of a variety of other sensors 50 or inputs, as discussed in detail below. For example, the animation selection made based on the handler's input at the base station 30 may be displayed on the display 14 for visualization by the performer, and the performer may then veto or accept (e.g., initiate) the animation selection by making certain eye movements or certain facial movements. In some embodiments, the handler is notified (e.g., via the display device 34) of the performer's action (e.g., acceptance, veto, delay, or modification) and/or the handler receives system status information (e.g., an indication of component failure, current animation selection, upcoming animation selection, or the like) from the Animated Character Head 10 via communication device 12 (e.g., transceiver).

In certain embodiments, the base station control system 30 may be used to control the various components of the Animated Character Head 10 and it should be understood that any of the features, functions, and/or techniques disclosed herein may be distributed between the Animated Character Head 10 and the base station control system 30 in any suitable manner. In the depicted embodiment, the controller 40 of the base station control system 30 contains the processor 44 that may execute instructions stored in the memory 42 to perform operations, such as selecting an animation (e.g., blink, smile, speak, etc.) to execute on the face of the Animated Character Head 10. As such, in some embodiments, the controller 40 may include one or more general purpose microprocessors, one or more application specific processors (ASICs), one or more field programmable logic arrays (FPGAs), or any combination thereof. Additionally, the memory 42 may be a tangible, non-transitory, computer-readable medium that stores instructions executable by and data to be processed by the processor 44. Thus, in some embodiments, the memory 42 may include random access memory (RAM), read only memory (ROM), rewritable non-volatile memory, flash memory, hard drives, optical discs, and the like.

Furthermore, the communication device 32 may enable the controller 40 to interface with various other electronic devices, such as the components illustrated in the Animated Character Head 10. For example, the communication device 32 may enable the controller 40 to communicatively couple to a network, such as a personal area network (PAN), a local area network (LAN), and/or a wide area network (WAN). Accordingly, in some embodiments, the controller 40 may process data from the input device 38 and communicate it to the Animated Character Head 10 via communication device 32. For example, the handler may push a set of buttons (e.g., virtual buttons) on the input device 38, which wirelessly transmits data via the communication device 32 to the Animated Character Head 10 to enable the face of the Animated Character Head 10 to output a sequence of animations (e.g., such that the Animated Character Head 10 may blink, smile, etc.). In further configurations, the communication device 32 may be wirelessly connected or may be connected via a wired connection to the Animated Character Head 10.

Additionally, the input device 38 of the base station control system 30 may enable the handler to interact with the controller 40, for example, to input instructions (e.g., control commands) to execute animations on the face of the Animated Character Head 10. Thus, in some embodiments, the input device 38 may include buttons, keyboards, mice, trackpads, and the like. Additionally or alternatively, the display 34 may include touch components that enable user inputs by the handler to the controller 40, whereby animations may be selected by detecting occurrence and/or position of an object touching the screen of the display 34 (e.g., surface of the display 34). In addition to enabling user inputs, the display 34 may present visual representations of information, such as the complete sequence of animations executed by the Animated Character Head 10, the library of animations, the system status of the Animated Character Head 10 (e.g., whether any components of the Animated Character Head 10 are malfunctioning), and/or an external live image of the Animated Character Head 10.

Furthermore, the communication device 12 may enable the controller 20 to interface with various other electronic devices such as the components of the base station control system 30. For example, the communication device 12 may enable the controller 20 to communicatively couple to a network, such as a personal area network (PAN), a local area network (LAN), and/or a wide area network (WAN). In further embodiments, the controller 20 may be communicatively coupled via a wired (e.g., land line) connection to the various components of the Animated Character Head 10 and/or the base station control system 30. Accordingly, in some embodiments, the controller 20 may process data received by the communication device 12 from the input device 38 of the base station control system 30 transmitted to the Animated Character Head 10 via communication device 32. For example, the handler of the base station control system 30 may push a set of buttons on an input device 38 that wirelessly transmit data via the communication device 32 to the communication device 12 of the Animated Character Head 10 to enable the face of the Animated Character Head 10 to output a complete motion profile, such that the Animated Character Head 10 may execute multiple animations (e.g., such as blink, smile, etc.).

In certain embodiments, the above-mentioned components of the base station control system 30 may supplement the components on the Animated Character Head 10. As such, the handler of the base station control system 30 may communicate with the performer (e.g., person wearing the Animated Character Head 10) to determine the best complete motion profile to execute on the face of the Animated Character Head 10. In further embodiments, the inputs of the performer inside the Animated Character Head 10 may override the inputs of the handler of the base station control system 30. In some embodiments, the inputs of the handler of the base station control system 30 may override the inputs of the performer in the Animated Character Head 10.

Figure 2:
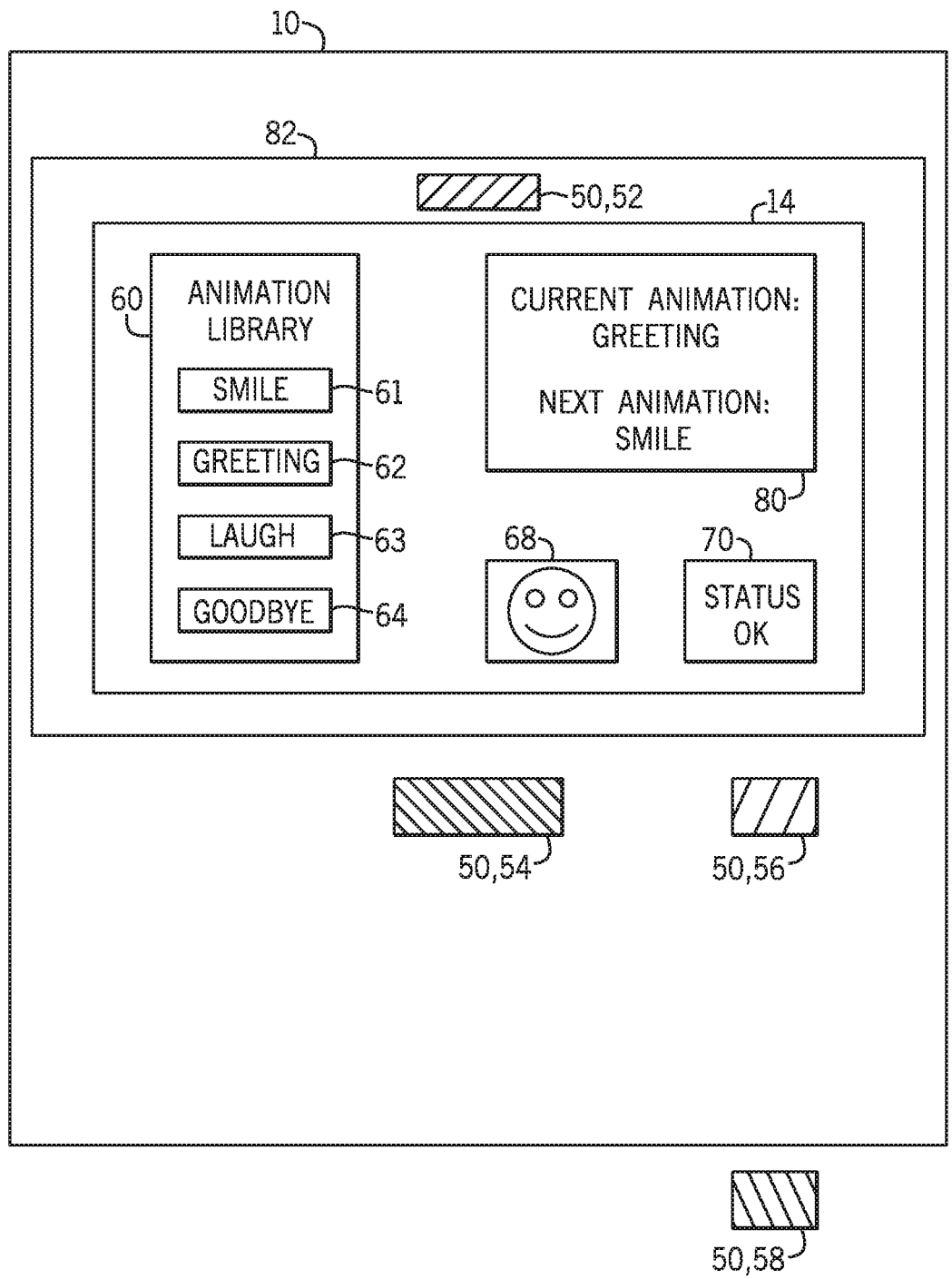
FIG. 2 is a block diagram of internal components of the Animated Character Head of FIG. 1, as seen from the point of view of a performer, in accordance with an embodiment.

FIG. 2 is a block diagram of internal components of an embodiment of the Animated Character Head 10, as seen from the point of view of a performer, when the performer is wearing the Animated Character Head 10. The inside of the Animated Character Head 10 may contain the display 14 (e.g., screen, which may be part of augmented reality glasses) that is configured to display information for visualization by the performer. For example, the display 14 may provide an indication of an animation library 60, where the animation library 60 may include, for example, a list of available animations, such as a first animation option 61 (e.g., smile), a second animation option 62 (e.g., greeting), a third animation option 63 (e.g. laugh), a fourth animation option 64 (e.g., goodbye), etc. In certain embodiments, the animation options may be stored in the memory 22. The Animated Character Head 10 may also include the one or more sensors 50, such as an eye tracking sensor 52, a machine vision sensor 54, an audio sensor 56, a physical input sensor 58, or any combination thereof. The one or more sensors 50 may facilitate selection of animations, such as by enabling the performer to scroll through and/or select an animation from the list of available animations 60.

Furthermore, a display of feedback information 80 may let the performer know what animation from the animation library is currently being executed (e.g. a current animation) and/or what animation from the animation library will be executed in the future (e.g., a next animation). In some embodiments, an external image 68 of the Animated Character Head 10 (e.g., obtained by the external camera 46 shown in FIG. 1) may be displayed to give the performer a visual representation of what animations are being executed on the face of the Animated Character Head 10 and/or a visual representation of the actions (e.g., expressions) of the amusement park guests interacting with the Animated Character Head 10. Furthermore, a display of the system status 70 may indicate the current status (e.g., good or bad) of the components of the Animated Character Head 10 (e.g., based on signals generated by the status sensor 74 shown in FIG. 1).

In certain embodiments, the one or more sensors 50 may include a sensor that monitors eye activity. As such, the one or more sensors 50 may include an eye tracking sensor 52 that can be utilized to monitor and/or receive inputs of a performer's eye activity to make animation selections from the list of available animations 60. For example, the Animated Character Head 10 may include one or more eye tracking sensors 52 configured to visually track movement of the performer's eyes, namely, by tracking movement of the performer's pupils. The eye tracking sensor 52 may send a signal to the controller 20 indicative of the eye movement of the performer to generate a first signal that is used by the controller 20 to scroll through and/or select an animation from the list of available animations 60, which may include any of the animations stored in the library of animations (e.g., in the memory 22). For example, when an performer focuses their eye on the second animation option 62, the eye tracking sensor 52 may identify this eye activity (e.g., focusing on the second animation option 62) and send to the controller 20 a signal indicative of this eye activity (e.g., an electrical signal) that is processed by the controller 20 to choose this animation selection from the list of available animations 60. In certain embodiments, the controller 20 may be configured to receive input signals from the eye tracking sensor 52 and to make an animation selection that causes the eyes of the Animated Character Head 10 to mimic movement of the performer's eyes. For example, if the performer blinks, the controller 20 may identify the signal from the eye tracking sensor 52 and choose an animation selection that causes (e.g., via control signals to appropriate actuators 18) the eyes of the Animated Character Head 10 to blink, and if the performer looks in a direction (e.g., upward, downward, left, or right), the controller 20 may make an animation selection that causes the eyes of the Animated Character Head 10 to look in the same direction.

Additionally or alternatively, in certain embodiments, the one or more sensors 50 may include machine vision sensors 54 such as imaging sensors and/or cameras, configured to visually track motions or movements of the performer's face (e.g., facial gestures). Such facial gestures may be coded and stored into the memory of the controller. The machine vision sensor 54 may send a signal to the controller 20 indicative of the face of the performer to generate a first signal that is used by the controller 20 to choose the animation selection from the library of animations, which may be stored in the memory 22. For example, when a performer makes an "o-shape" with their mouth, the machine vision sensor 54 may identify this facial gesture and send to the controller 20 a signal indicative of this facial gesture (e.g., an electrical signal) that is processed by the controller 20 to choose the animation selection from the library of animations. For example, by making an "o-shape" with their mouth, a performer may send the controller 20 a signal indicative of the "o-shaped" mouth of the performer that causes the Animated Character Head 10 to perform both the first animation option 61 and the second animation option 62 (e.g., thereby causing the Animated Character Head 10 to smile and say "hello").

Additionally or alternatively, in certain embodiments, the controller 20 may be configured to receive input signals from the machine vision sensors 54 that cause certain facial features of the Animated Character Head 10 to mimic the facial features of the performer. For example, if the performer smiles, the one or more machine vision sensors 54 may generate signals indicative of the performer's smile, and the signals may be processed by the controller 20 to make an appropriate animation selections, that causes (e.g., via control signals to appropriate actuators 18) the Animated Character Head 10 to smile. In some embodiments, the one or more machine vision sensors 54 may be configured to obtain images (e.g., still or moving images, such as video) of the performer's face, which may be displayed as feedback information 80, which may facilitate training of the performer to enable the performer to efficiently learn how to cause the desired animation selection. In some embodiments, within the Animated Character Head 10, the display of the image of the performer's face may be provided concurrently as feedback information 80 with the display of the image of the currently animation being executed to facilitate training of the performer.

Additionally or alternatively, in certain embodiments, vocal command may be utilized to make animation selections and the one or more sensors 50 may include an audio sensor 56 or any sensor that identifies sound (e.g., sound identifying sensors or speech recognition sensor). The audio sensor 56 may be configured to detect the performer's voice or speech. The performer's voice or speech (e.g., certain vocal cues) may send signals to the controller 20 via the audio sensor 56 that may be processed and utilized by the controller 20 to make animation selections (e.g., displayed as current animation once being performed) from the library of animations based at least in part on those signals. In certain embodiments, the audio sensor 56 and/or the controller 20 may be configured to identify various specific phonemes in the performer's speech. In certain embodiments, the controller 20 may make an animation selection that causes (e.g., via control signals to appropriate actuators 18) the mouth of the Animated Character Head 10 to mimic or match the speech of the performer. The sounds outputted by the Animated Character Head 10 may be produced by the speaker 16 (shown in FIG. 1) in the Animated Character Head 10. In certain embodiments, the controller 20 may be configured to make an animation selection that causes the mouth of the Animated Character Head 10 to correspond to the cadence and/or phonemes of the speech of the performer, and/or to cause the mouth of the Animated Character Head 10 to lip sync (e.g., move mouth in synchronization with the performer's speech). Such lip synchronization may be achieved with the audio sensor 56, the motion tracking sensor 54, or any combination thereof.

Additionally or alternatively, in certain embodiments, the one or more sensors 50 may include a physical input sensor 58 operated by the performer's body. The physical input sensor 58 may be a switch, button, motion sensors, foot controls, or any suitable wearable input device, such as a myo input, ring input, or gesture gloves. The physical inputs may be utilized by the controller 20 to make animation selections from the library of animations. More specifically, the physical inputs from the performer to the physical input sensors 58 may send signals to the controller 20 that may be processed and utilized by the controller 20 to execute animation selections (e.g., displayed as current animation once being performed) from the library of animations.

The aforementioned sensors 50 (e.g., eye tracking sensor 52, motion tracking sensor 54, audio sensor 56, and physical input sensor 58) may be used in any combination by the performer of the Animated Character Head 10. For example, the Animated Character Head 10 may have only an eye tracking sensor 52 and a physical input sensor 58. In such a case, the selection of the animation from the library of animations will be based on the inputs into these sensors 50 (e.g., based on activity of the pupil and a button on the palm of the performer). To further elaborate on this example, the performer may focus their vision on the third animation option 63. Once the third animation option 63 is highlighted in response to the eye tracking sensor 52 detecting the performer's focus on the third animation option 63, the performer may then press the button (e.g., with a finger) to send a signal to the controller 20 that causes the Animated Character Head 10 to execute the third animation option 63.

Some existing systems may utilize switches activated using the performers hands and fingers to facilitate performance with animated characters; however, such gestures may be highly visible to the audience. The disclosed embodiments may utilize non-obvious, invisible, and/or unseen motions of the performer, such as motions of the performer's face and/or eyes, to navigate and/or select from the library (e.g., database or selection menu), thereby eliminating and/or reducing the use of other gestures or extraneous gestures that may detract from performance, for example.

In certain embodiments, the Animated Character Head may include a three-part design. For example, the Animated Character Head may contain a front face part, a rear head part, and a glasses arrangement 82 (e.g., augmented reality glasses), where each of the three parts couple to one another. The glasses arrangement may contain the display 14 configured to show the animation library 60, the external image 68, the system status 70, and/or the feedback information 80, such as the current animation. Furthermore, the sensors 50, such as eye tracking sensors 52, the motion tracking sensors 54, and/or the audio sensors 56, may be positioned on or about the glasses arrangement 82. As another example, the Animated Character Head may contain a three layer arrangement, where the internal layer may be a face mold that fits the face of a performer with holes for the eyes, the middle layer may contain the display 14 of the various components illustrated in FIG. 2, and the outermost layer may contain the face of the animated character configured to receive inputs from the sensors 50 and produce a motion profile via the actuators 18, as discussed in detail above.

The disclosed embodiments and the aforementioned sensors 50 may be supplemented to include integrated augmented reality and/or machine vision technology (e.g., integral to the Animated Character Head 10). The array of sensors 50, status sensors 74, cameras 68, and processing components (e.g., processors 24, 44) configured to monitor the various components (e.g., mechanical components, such as actuators 18 and/or light sources 26) of the Animated Character Head 10 are connected to the onboard controller 20, such that component failures can be detected and displayed as the system status 70, as well as audibly and/or visually reported to the performer and/or the handler of the base station control system 30. Thus, the system may be able to detect component failures and/or respond in a manner that will not harm the performer or negatively impact the performance. For example, if a particular actuator 18 is not functioning properly, animation selections that rely on the particular actuator 18 may be removed from the list of available animations 60 and/or otherwise made inaccessible, for example. In some embodiments, this feedback information (e.g., component status, such as component failures) may be relayed to the performer via the display 14, as well as wirelessly to maintenance technicians.

As mentioned above, the Animated Character Head 10 includes the display 14, such as augmented reality interface (e.g., glasses), head-mounted display, optical projection system, or the like to enable visualization of various information by the performer. In further embodiments, the Animated Character Head 10 may be configured to monitor the system status 70 (e.g., detect component failures using one or more status sensors 74, such as if a performed animation does not correspond to the selected animation) and/or to display system status (e.g., an indication of component failure, current animation selection, upcoming animation selection, currently playing animation, or the like) to the performer, such as on the display 14 or augmented reality interface. Further, the system status 70 may contain an indication of whether the overall functionality of the Animated Character Head 10 is ok or not. For example, if a component in the Animated Character Head 10 (e.g., an actuator 18) is failing, the system status 70 may display "bad" as the indication. It should be understood that a handler may utilize the base station 30 to provide inputs and/or to interact with the Animated Character Head 10, in the manner discussed above with respect to FIG. 1.

Figure 3:
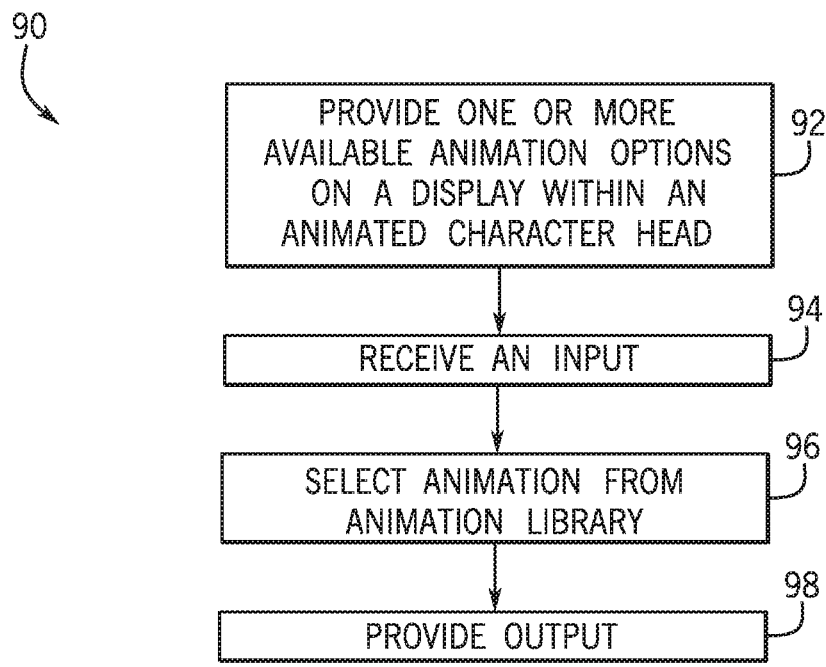
FIG. 3 is a flow diagram of a method for outputting an animation for the Animated Character Head of FIG. 1, in accordance with an embodiment.

FIG. 3 is a flow diagram of a method 90 for outputting an animation via the Animated Character Head 10. The method 90 includes various steps represented by blocks. It should be noted that the method 90 may be performed as an automated procedure by a system, such as the system having the Animated Character Head 10 and/or the base station control system 30. Although the flow chart illustrates the steps in a certain sequence, it should be understood that the steps may be performed in any suitable order and certain steps may be carried out simultaneously, where appropriate. Further, certain steps or portions of the method 90 may be omitted and other steps may be added. The method 90 may be carried out in response to performer input (e.g., via the one or more sensors 50), in response to handler input (e.g., via the input device 38), or the like.

As illustrated, the method 90 includes providing one or more available animation options on the display 14 within the Animated Character Head 10 (block 92), receiving an input (block 94), selecting an animation from the animation library (block 96), and providing an output (block 98).

In more detail, the method 90 provides one or more available animation options on the display 14 within the Animated Character Head 10 (block 92). As discussed in detail above, on the display inside the Animated Character Head 10, there may be the list of available animation options 60 (e.g., smile, frown, laugh, speak, etc.) from the animation library (e.g., stored in the memory 22) that may be executed by the Animated Character Head 10. The display of the available animation options may be organized as a list displaying all available animation options (e.g., a first animation, such as a smile, a second animation, such as a greeting, a third animation, such as a laugh, etc.), a menu with categories (e.g., a first category such as mouth motions, a second category such as eye motions, a third category such as sounds, etc.), a web network displaying the animation options, or any other suitable manner of displaying the animation options and/or facilitating review and/or selection of the animation options. The efficiency and speed at which a performer selects animations to execute on the face of the Animated Character Head 10 may enhance the overall effectiveness of the Animated Character Head 10.

The method 90 receives an input (block 94) to select an animation from the animation library. The input may be eye activity (e.g., pupil motion) from the performer inside the Animated Character Head, the facial gestures of the performer (e.g., mouthing an "o-shape"), sound (e.g., verbal commands, etc.) from the performer, physical inputs (e.g., pressing buttons hidden in the hands of the performer), inputs from a handler of the base station control system 30, and/or any suitable inputs. As discussed in detail above any suitable sensor 50 in the Animated Character Head 10 or any suitable input device 38 of the base station control system 30 may be used to provide the input. For example, an eye tracking sensor may be used to detect and/or monitor eye activity, a motion tracking sensor may be used to detect and/or monitor facial gestures, an audio sensor may be used to detect and/or monitor sound, a handheld sensor may be used to detect and/or monitor a physical input, and/or a wireless touch-screen device may be used to receive inputs from the handler. The sensors 50 and/or input devices 38 may generate signals that are provided to a processor (e.g., the processor 24, 44) to facilitate selection of an animation from the animation library (e.g., stored in a memory, such as the memory 22, 42).

In certain embodiments any of the aforementioned sensors may be used in conjunction with one another to supplement each other. For example, the eye tracking sensor 52 may be used to identify pupil activity to scroll through the list of available animations 60 from the animation library and the audio sensor 56 may make a choice on which animation to execute when a performer utters the word "select." In additional embodiments, a sensor priority scheme may be implemented so that an input to one sensor 50 can override the input to another sensor 50. For example, an input to the eye tracking sensor 52 by the performer may override an input from a handler controlling the base station control system 30.

The input (e.g., signals from the sensors 50 and/or input device 38) is processed at a controller (e.g., the controller 20, 40) to select an animation from the animation library (block 96).

Once selected, the animation is executed as an output (block 98) by the Animated Character Head 10. The output provided (block 98) may be in the form of animations executed on the physical structure (e.g., face) of the Animated Character Head 10. For example, the output provided by the Animated Character Head 10 may be a frown, a smile, a nod, a blink, sounds, an emissions of lights, and the like and may be effected by providing a control signal to the actuators 18 and/or the light source 26 (e.g., to cause light projection or graphic-based animation) in accordance with the selected animation, for example. In some embodiments, the light source 26 may be configured to project light onto a screen or other surface of the Animated Character Head 10, such as to display a still image, a moving image (e.g., a video), or other visible representation of facial features or gestures on the Animated Character Head 10. In some embodiments, the actuators 18 and/or the light source 26 may enable the Animated Character Head 10 to provide any of a variety of projected facial features or gestures, animatronic facial features or gestures, or combinations thereof. It should be understood that a handler may utilize the base station 30 to provide inputs and/or to interact with the Animated Character Head 10, in the manner discussed above with respect to FIG. 1.

Figure 4:
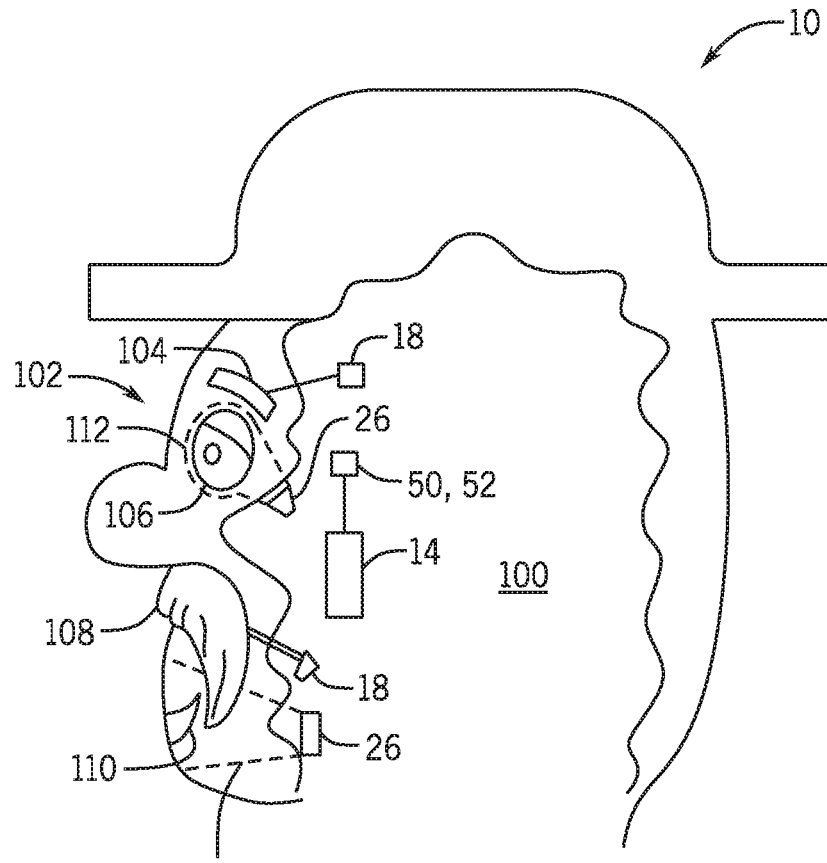
FIG. 4 is a cross-sectional side view of the Animated Character Head of FIG. 1, in accordance with an embodiment.

FIG. 4 is a cross-sectional side view of an embodiment the Animated Character Head 10. As shown, the Animated Character Head 10 includes an opening 100 configured to receive and/or surround a performer's head, and an outer surface 102 (e.g., face) that is visible to a guest. The outer surface 102 may support various features, such as an eyebrow 104 and a mustache 108, which may be actuated via respective actuators 18 based on a control signal (e.g., received from the processor 24). In certain embodiments, screens 112 may be positioned about the Animated Character Head 10 to enable display of certain gestures and/or features, such as an eye 106 and a mouth 110, via light projection onto the screens 112. As discussed above, light sources 26 may be provided to project light onto the screens 112 to display such gestures and/or features in response to receipt of a control signal (e.g., received from the processor 24). As shown, the Animated Character Head 10 may include the display 14 and the one or more sensors 50. For example, the display 14 may provide information to the performer, and the eye tracking sensor 52 may be proximate to the display 14 to track eye movement of the performer.

While only certain features of the present disclosure have been illustrated and described herein, many modifications and changes will occur to those skilled in the art. Further, it should be understood that components of various embodiments disclosed herein may be combined or exchanged with one another. It is, therefore, to be understood that the appended claims are intended to cover all such modifications and changes as fall within the true spirit of the disclosure.

The invention claimed is:

1. A system, comprising:
an animated character head, comprising:
a sensor including a motion tracking sensor configured to monitor facial gestures of a performer wearing the animated character head and generate an input based on the facial gestures;
one or more processors configured to receive the input from the sensor, make an animation selection from a plurality of options displayed on a display based on the input, and provide a first control signal based on the animation selection, wherein:
the display is positioned within the animated character head; and
the display is configured to display an indication of the animation selection for visualization by the performer wearing the animated character head.

2. The system of claim 1, wherein the sensor comprises an eye tracking sensor configured to monitor movement of an eye of the performer and to generate the input based on the movement of the eye of the performer.

3. The system of claim 1, wherein the animated character head comprises a memory storing a library of animations including the plurality of options, and the one or more processors are configured to make the animation selection by selecting an animation from the library of animations based on the input.

4. The system of claim 1, wherein the control signal is configured to cause a speaker to output pre-programmed audio corresponding to the animation selection.

5. The system of claim 1, comprising an actuator configured to receive the control signal and cause movement of a component of the animated character head based on the control signal, wherein the one or more processors are configured to receive a status signal indicative of a status of the actuator from a status sensor associated with the actuator and to provide an indication of the status on the display.

6. The system of claim 1, wherein the system comprises a base station control system that is physically separate from the animated character head, and the base station control system comprises an input device that is configured to generate an additional input and to provide the additional input to the one or more processors.

7. The system of claim 6, wherein the one or more processors are configured to receive a confirmation input from the performer to confirm the animation selection, and to provide the control signal after receipt of the confirmation input.

8. The system of claim 1, wherein the animated character head comprises a glasses arrangement, comprising the display.

9. A system, comprising:
an animated character head, comprising:
one or more processors configured to:
receive an input;
make an animation selection from a plurality of options displayed on a display based on the input;
provide a control signal based on the animation selection, wherein the input comprises a first signal indicative of eye movement of a performer wearing and operating the animated character head, a second signal indicative of facial gestures of the performer wearing and operating the animated character head, or a combination thereof; and
display to the performer, via the display positioned within the animated character head, an indication of the animation selection, and a visual feedback indicative of an animation executed by the animated character head based on the control signal.

10. The system of claim 9, wherein the animated character head comprises a memory storing a library of animations including the plurality of options, and the one or more processors are configured to make the animation selection by selecting the animation from the library of animations based on the input.

11. The system of claim 9, wherein the animated character head comprises an eye tracking sensor configured to generate the first signal indicative of eye movement of the performer.

12. The system of claim 9, wherein the animated character head comprises a motion tracking sensor configured to generate the second signal indicative of facial gestures of the performer.

13. The system of claim 9, wherein the one or more processors are configured to instruct the display to display a list of available animations for visualization by the performer.

14. A method, comprising:
displaying, using one or more processors, one or more available animation selections on a display within an animated character head;
receiving a selection, using the one or more processors, of a chosen animation of the one or more available animation selections based on an eye movement of a performer operating the animated character head, a facial gesture of the performer operating the animated character head, a vocal command of the performer operating the animated character head, or a combination thereof;
providing, using the one or more processors, a control signal to execute the chosen animation with the animated character head; and
displaying to the performer, using the one or more processors, and via the display within the animated character head, an indication of the selection of the chosen animation and a visual feedback indicative of execution of the chosen animation by the animated character head based on the control signal.

15. The method of claim 14, wherein providing the control signal to execute the chosen animation comprises providing the control signal to one or more actuators that are configured to physically adjust a feature of the animated character head.

16. The method of claim 15, comprising receiving a status signal indicative of a status of an actuator of the one or more actuators from a status sensor associated with the actuator, and instructing the display to display an indication of the status of the actuator using the one or more processors.

17. The method of claim 14, wherein providing the control signal to execute the chosen animation comprises providing the control signal to one or more speakers of the animated character head to provide an audible output.

18. The method of claim 14, comprising selecting an additional chosen animation of the one or more available animation selections using the one or more processors, wherein the chosen animation is selected based on the eye movement of the performer and the additional chosen animation is selected based on the vocal command of the performer.

19. The method of claim 14, wherein the one or more available animation selections are established by a handler at a base station control system that is physically separate from the animated character head.

* * * * *